(12) United States Patent
Kawano et al.

(10) Patent No.: US 7,087,204 B2
(45) Date of Patent: Aug. 8, 2006

(54) REACTION UNIT

(75) Inventors: Koji Kawano, Osaka (JP); Kenichiro Matsuba, Chiba (JP); Katsunori Yagou, Chiba (JP)

(73) Assignee: Toyo Engineering Corporation, Tokyo (JP)

( * ) Notice: Subject to any disclaimer, the term of this patent is extended or adjusted under 35 U.S.C. 154(b) by 582 days.

(21) Appl. No.: 10/239,166

(22) PCT Filed: Jan. 28, 2002

(86) PCT No.: PCT/JP02/00589

§ 371 (c)(1),
(2), (4) Date: Sep. 23, 2002

(87) PCT Pub. No.: WO02/060571

PCT Pub. Date: Aug. 8, 2002

(65) Prior Publication Data

US 2003/0147790 A1 Aug. 7, 2003

(30) Foreign Application Priority Data

Jan. 29, 2001 (JP) ............................... 2001-20449

(51) Int. Cl.
*B01J 19/00* (2006.01)
*B32B 5/02* (2006.01)
*B32B 27/04* (2006.01)

(52) U.S. Cl. ...................... 422/135; 422/131; 422/136; 422/138; 366/312

(58) Field of Classification Search ................ 422/131, 422/135, 136, 138; 366/312
See application file for complete search history.

(56) References Cited

U.S. PATENT DOCUMENTS

| | | | | |
|---|---|---|---|---|
| 3,553,171 A | * | 1/1971 | Ocker | 526/65 |
| 3,977,655 A | * | 8/1976 | Okabayashi et al. | 366/325.4 |
| 3,980,281 A | * | 9/1976 | Okabayashi et al. | 366/279 |
| 5,599,507 A | * | 2/1997 | Shaw et al. | 422/135 |
| 5,611,926 A | * | 3/1997 | Nishida | 210/512.3 |
| 2002/0191483 A1 | * | 12/2002 | Ohtsuki et al. | 366/107 |

FOREIGN PATENT DOCUMENTS

| | | |
|---|---|---|
| EP | 0 272 107 A2 | 6/1988 |
| EP | 0 402 662 | * 12/1990 |
| GB | 1 404 163 | 8/1975 |
| GB | 2 295 969 A | 6/1996 |

(Continued)

OTHER PUBLICATIONS

Patent Abstracts of Japan, JP 11-106406, Apr. 20, 1999.

*Primary Examiner*—N. Bhat
(74) *Attorney, Agent, or Firm*—Oblon, Spivak, McClelland, Maier & Neustadt, P.C.

(57) ABSTRACT

A reactor which is a reactor (4) in the form of a cylindrical vessel having a liquid inlet and a liquid outlet and elongated in a flowing direction, comprising, in the interior, a drive shaft (6) coaxial with the reactor, one or more stages of plate-shaped or round-bar-shaped agitating elements (1) extending in a direction perpendicular to the drive shaft, baffles composed of plates or round bars or combination thereof and/or coiled, tubular, plate-shaped or helical heat-exchangers (7) installed on the inner wall side of the reactor, wherein the natural frequency of the agitating elements is greater than the numerical value at which the agitating elements begin to vibrate, the value being calculated from the viscosity of the solution in the reactor, and the rotating speed and structure of the agitating elements.

6 Claims, 5 Drawing Sheets

FOREIGN PATENT DOCUMENTS

| | | |
|---|---|---|
| JP | 4-335001 | 11/1992 |
| JP | 5-59782 | 8/1993 |
| JP | 10-337461 | 12/1998 |
| JP | 11-106406 | 4/1999 |
| JP | 2001-137679 | 5/2001 |
| JP | 2001-340741 | 12/2001 |

* cited by examiner

● Rotating speed at which the value (K) became equal to the natural frequency
■ Rotating speed at which observed vibrations began

Fig. 10

● Rotating speed at which the value (K) became equal to the natural frequency
■ Rotating speed at which observed vibrations began

Fig. 11

● Rotating speed at which the value (K) became equal to the natural frequency
■ Rotating speed at which observed vibrations began

Fig. 12

● Rotating speed at which the value (K) became equal to the natural frequency
■ Rotating speed at which observed vibrations began

REACTION UNIT

TECHNICAL FIELD

This invention relates to a reactor, and especially to a reactor for producing polymers. More specifically, the present invention is concerned with a reactor for producing a styrene polymer or a styrene copolymer by solution polymerization or bulk polymerization.

BACKGROUND ART

As production processes of polymers, emulsion polymerization, suspension polymerization, solution polymerization and bulk polymerization are widely known. Depending on the polymerization process, the resulting polymer somewhat differs in properties. An appropriate polymerization process is, therefore, chosen and adopted in accordance with the desired polymer.

In particular, solution polymerization and bulk polymerization have found wide-spread utility, as they are resource saving and energy saving and they also permit easy solution of pollution problems by adopting them as closed processes.

In each of solution polymerization and bulk polymerization, however, dissolution of a polymer in a solvent results in a homogeneous phase system so that the viscosity of the polymerization mixture increases as the polymerization progresses. Another problem is also involved in that, as the production scale of a polymer increases, the heat removal area decreases inversely to the increase of the reactor volume.

In general, however, it is difficult to remove the heat evolved in a polymerization reaction from the polymerization mixture the viscosity of which is high. In addition, the reactor is brought into such a state that a zone which does not move for a long time, in other words, a zone of so-called extraordinary stagnation tends to occur in the reactor. When a zone of extraordinary stagnation occurs, the polymer formed in this zone is susceptible to deterioration or gelling, and may adhere the inside of the reactor. Mixing of such a polymer in a normal polymer results in a substantial impairment to the quality of the resulting polymer.

To overcome this problem, a variety of approaches have been proposed to avoid occurrence of a zone of extraordinary stagnation. One of such approaches is to complete polymerization without raising the final polymerization degree, that is, while the viscosity of the polymerization mixture is still low. According to this approach, the polymerization mixture under processing is low in viscosity so that a zone of extraordinary stagnation hardly occurs. This approach, however, has developed a new problem that the operation rate of the reactor is reduced.

Another approach is to apply a shearing stress to a polymerization mixture such that a shear rate in the vicinity of a heat transfer surface is increased to heighten the heat removing ability and also to prevent occurrence of a zone of extraordinary stagnation. This approach, however, is accompanied by a problem in that, when a screw-type agitating element is employed, vigorous mixing takes place in the reactor and the residence time distribution of the polymerization mixture in the reactor becomes broader with the agitating power.

To overcome the above-described problems, reactors have been proposed as polymerization reactors for processing fluid of increased viscosity, which have a narrow residence time distribution, that is, high piston flow characteristics and permit even removal of reaction heat.

These reactors include, for example, the reactor disclosed in U.S. Pat. No. 2,727,884 and the reactor disclosed in JP-A-04335001. The former reactor is equipped with plural heat exchanger tubes and agitating elements, which are combined in multiple stages. The latter reactor has agitating elements arranged at intervals in plural stages and passages arranged for a heat transfer medium between the agitating elements, and is also provided with a cylindrical heat transfer element arranged surrounding a periphery of a drive shaft.

The reactor disclosed in U.S. Pat. No. 2,727,884 tends to develop grid-like channeling in the flowing direction of a polymer and a zone of extraordinary stagnation when agitation is insufficient. As large clearances exist between the agitating elements and the heat exchanger tubes corresponding thereto, the reactor involves another problem in that the surface renewal rate on and along the surface of each heat exchanger tube is low, resulting in adhesion of the resulting polymer, blocking with the resulting polymer, a reduction in heat transfer coefficient or the like.

When agitation is conducted in an attempt to apply a shearing stress in order to increase the surface renewal rate on the surface of each heat exchanger tube, the agitating element is caused to vibrate in the direction of lift by so-called Karman's vortices produced from the agitating element, and by resonance, is brought into contact with the heat exchanger tube, leading to a stress fracture. Especially when the distances between the heat exchanger tubes and the agitating elements are small, such vibrations pronouncedly occur on the agitating elements.

As such vibrations of the agitating elements also occur in an initial stage of polymerization, at the time of an initiation and termination of polymerization, and in some instances, during washing of a reactor with a solvent or the like, no sufficient shearing stress can be applied in such a reactor in the initial stage of polymerization, at the time of the initiation and termination of polymerization, and in some instances, during washing of the reactor with the solvent or the like. As a consequence, the controllability of the polymerization reaction is reduced in the initial stage of the polymerization or at the time of the initiation or termination of the polymerization, and upon washing with the solvent or the like, the washing time becomes longer.

The reactor disclosed in JP-A-04335001, on the other hand, has the passages for the heat transfer medium, which are arranged between the agitating elements disposed in plural stages. Channeling of a polymer, therefore, occurs through the cylindrical heat transfer element arranged surrounding the periphery of the drive shaft or, when the flow velocity of the polymer passing through the heat transfer element is low, the surface renewal rate on the heat transfer element is low. As a consequence, this process involves a problem such as adhesion of the polymer, blocking of the heat transfer element or a reduction in heat transfer coefficient.

To overcome the above-described problems of the conventional art, the present inventors proposed in JP-A-11106406 a reactor in which each agitating element has a natural frequency of 40 Hz or higher.

It has, however, been found that, in this proposal, the agitating elements each having a natural frequency lower than 40 Hz can still be usable without developing vibrations depending on the rotating speed of the agitating elements or the viscosity of a polymer solution and also that, in this reactor, even the agitating elements each having a natural frequency of 40 Hz or higher in contrast may develop vibrations when the viscosity of a polymerization mixture is low, when the rotating speed is high or when the distances between heat exchanger tubes and the heat exchanger tubes are small. Due to the limitation of the natural frequency of each agitating element to 40 Hz or higher, agitating elements each having an unnecessarily large thickness relative to its width or agitating elements each having a large diameter are used even under such operation conditions that vibrations are not developed even when each agitating element has a natural frequency lower than 40 Hz. As a consequence, the above reactor has also been found to involve another problem that the effective volume of the reactor is decreased.

There is a known phenomenon that, as the moving speed of an object through a fluid increases, Karman's vortices are produced and that, when a forced frequency in the direction of the resulting lift coincides with the natural frequency of the object, the object develops resonance to result in a significant increase in amplitude in the direction of the lift. Agitating elements also develop resonance and a similar phenomenon when the rotating speed increases and the shaking frequency in the direction of lift coincides with the natural frequency of the agitating elements. However, the rotating speed of each agitating element is low at a base portion thereof close to the drive shaft but is high at tips thereof. It has, therefore, been difficult to determine to which extent of rotating speed of the agitating elements would not develop vibrations and would be safe. As the shaking frequency also varies depending on the distance between heat exchanger tubes and their adjacent agitating elements and the viscosity of each polymer solution, no proposal has been made yet on designing of a safe reactor on the basis of a formula which reflects these conditions.

DISCLOSURE OF THE INVENTION

An object of the present invention is to provide a reactor necessarily and sufficiently designed to satisfy operation conditions such that no zone of extraordinary stagnation occurs in the reactor, no vibrations occur on agitating elements, and a sufficient shearing stress can be applied in an initial stage of polymerization, at the time of an initiation and termination of polymerization and in some instances, also during washing of the reactor with a solvent or the like.

Another object of the present invention is to provide a reactor having high adjustability sufficient to decide the scope of the operation or conversely to permit modifications to the design of internal agitating elements such that the required operation conditions are satisfied, when the reactor is used for a different purpose in the future.

The present inventors have proceeded with an extensive investigation to solve the above-described problems. As a result, they have found the existence of a correlation between the natural frequency of each agitating element and a value at which the agitating element begins to vibrate, said value being derived from the viscosity of a solution inside a reactor, the rotating speed of the agitating element and the construction of the agitating element, leading to the completion of the present invention.

A reactor according to the present invention comprises a cylindrical vessel elongated in a flowing direction of a liquid and provided with a liquid inlet and a liquid outlet, a drive shaft arranged coaxially with the cylindrical vessel and one or more plate-shaped or round-bar-shaped agitating elements extending in a direction perpendicular to the drive shaft, said drive shaft and agitating elements being arranged inside the cylindrical vessel, and baffles composed of plates or bars or combinations thereof and/or coiled, tubular, plate-shaped or helical heat exchangers, said baffles and/or heat exchangers being arranged on a side of an inner wall of the reactor. The reactor is characterized in that the agitating elements each has a natural frequency greater than a value (K) at which the agitating element begins to vibrate, and the value is determined from the following formula:

$$(K) = \frac{(4.317(D/H)^2 + 0.867)(n/60)R/D}{1 - \exp(-0.1404\mu - 0.8633)}$$

wherein
   n: rotating speed (rpm) of the agitating element,
   R: length (m) of the agitating element from a center of the drive shaft to each tip of the agitating element,
   D: width (m) of the agitating element projected on a plane parallel to the drive shaft as measured in a direction of the drive shaft,
   H: distance (m), as measured in the direction of the drive shaft, between centers of widths of the plates or bars or combinations thereof or the coiled, tubular, plate-shaped or helical heat exchangers, which are projected on the plane parallel to the drive shaft and interpose the agitating element,
   $\mu$: viscosity (poise) of the liquid inside the reactor.

The reactor according to the present invention can be used preferably for a polymerization reaction such as solution polymerization or bulk polymerization, especially for producing a styrene polymer or styrene copolymer.

In the reactor according to the present invention, the ratio of the length (l) of the cylindrical vessel, as measured in the flowing direction of the liquid, to its diameter (d) ranges preferably from 1.1 to 15.

In the reactor according to the present invention, each of the agitating elements may be a flat-blade paddle or pitched blade paddle, a rectangular, rhombic, elongated rectangular or elliptic plate, a round bar cut off at upper and lower sides thereof or a bar having a triangular shape in cross-section, which may optionally be tapered, or may optionally be twisted or tilted with respect to the flowing direction of the liquid. In the reactor according to the present invention, D/H in the formula ranges preferably from 0.1 to 0.6.

BRIEF DESCRIPTION OF THE DRAWINGS

In the accompanying drawings.

BEST MODE FOR CARRYING OUT THE INVENTION

In the present invention, a reactor composed of the cylindrical vessel elongated in the flowing direction of the liquid may have a length (l), as measured in the flowing direction of the liquid, to diameter (d) ratio l/d of preferably from 1.1 to 15, more preferably from 1.5 to 10, particularly preferably from 2 to 8.

The agitating elements are arranged in the proximity of the baffles composed of plates or bars or combinations thereof, or heat exchangers, e.g., the coiled, tubular, plate-shaped or helical heat exchangers. Preferably, their D/H ratio may range from 0.1 to 0.6, with a range of from 0.2 to 0.5 being more preferred.

In the present invention, each of the agitating elements substantially perpendicular to the drive shaft may be, for example, a flat-blade paddle or pitched blade paddle, a rectangular, rhombic, elongated rectangular or elliptic plate, a round bar cut off at upper and lower sides thereof or a bar having a triangular shape in cross-section, which may optionally be tapered or may optionally be twisted or tilted with respect to the flowing direction of the liquid.

Monomers which can be subjected to solution polymerization or bulk polymerization in a polymerization reactor of a preferred embodiment of the present invention are, for example, ethylene and propylene; and alkenyl aromatic compounds such as styrene, alpha-methylstyrene, styrenes having alkyl-substituted benzene rings, e.g., o-, m- and p-methylstyrenes and o-, m- and p-ethylstyrenes, and styrenes having halogenated benzene rings, e.g., o-, m- and p-chlorostyrenes and o-, m- and p-bromostyrenes. These monomers can be used either singly or in combination. To these monomers, one or more copolymerizable monomers such as acrylonitrile and methacrylic esters may be added. Further, rubbery polymers, for example, polybutadiene, copolymers of butadiene with styrene, acrylonitrile and methyl methacrylate, natural rubber, polychloroprene, ethylene-propylene copolymer and ethylene-propylene-diene monomer copolymers can also be used in the form of solutions dissolved in the above-described monomers. In addition, the reactor according to the present invention can also be applied to the production of polymers available by addition reactions and polymers available by condensation polymerization reactions, such as nylons and polyesters.

The present invention will next be described in detail with reference to the drawings.

Figure 1:
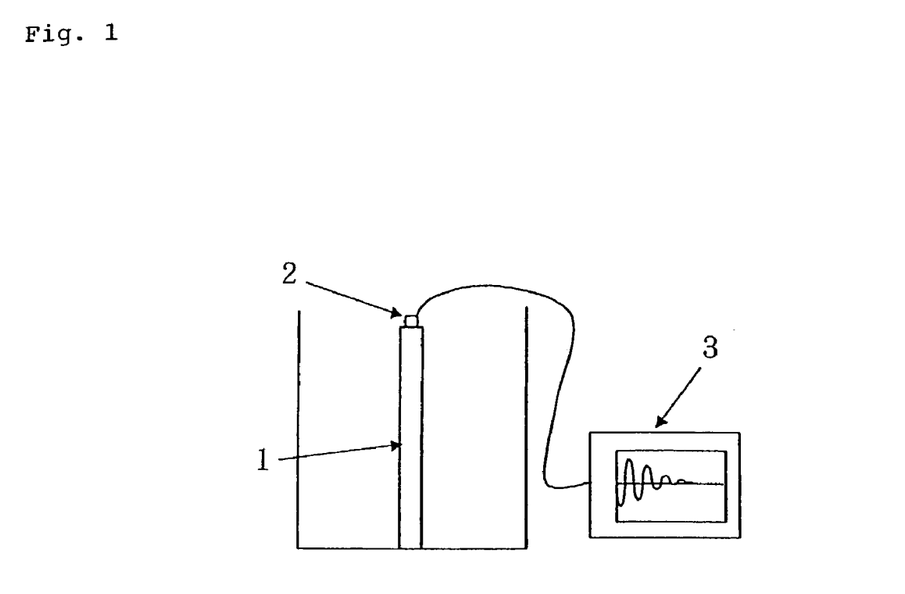
FIG. 1 is a schematic illustration of an apparatus employed to measure natural frequencies in the present invention.

As shown in FIG. 1, in the apparatus for measuring the natural frequency of each agitating element, an agitating element 1 the length of which is equal to the length from an actual drive shaft to each tip of an agitating element is fixedly secured, and an acceleration sensor 2 is mounted on the tip of the agitating element 1. An initial displacement is applied to the agitating element by hand, and the resulting natural frequency of the agitating element is measured by an amplifier 3.

The reactor according to the one embodiment of the present invention will be described with reference to FIG. 2 and FIG. 3. FIG. 3 is a horizontal cross-sectional view taken in the direction of arrows A—A of FIG. 2. A cylindrical reactor 4 elongated in the flowing direction of a polymerization mixture is provided on an outer wall thereof with a jacket 5, and a drive shaft 6 is inserted in the reactor 4 such that the drive shaft 6 extends coaxially with the reactor 4. On the drive shaft 6, agitating elements 1 are arranged at predetermined intervals in multiple stages such that the agitating elements 1 extend in a direction perpendicular to the drive shaft 6.

Figure 2:
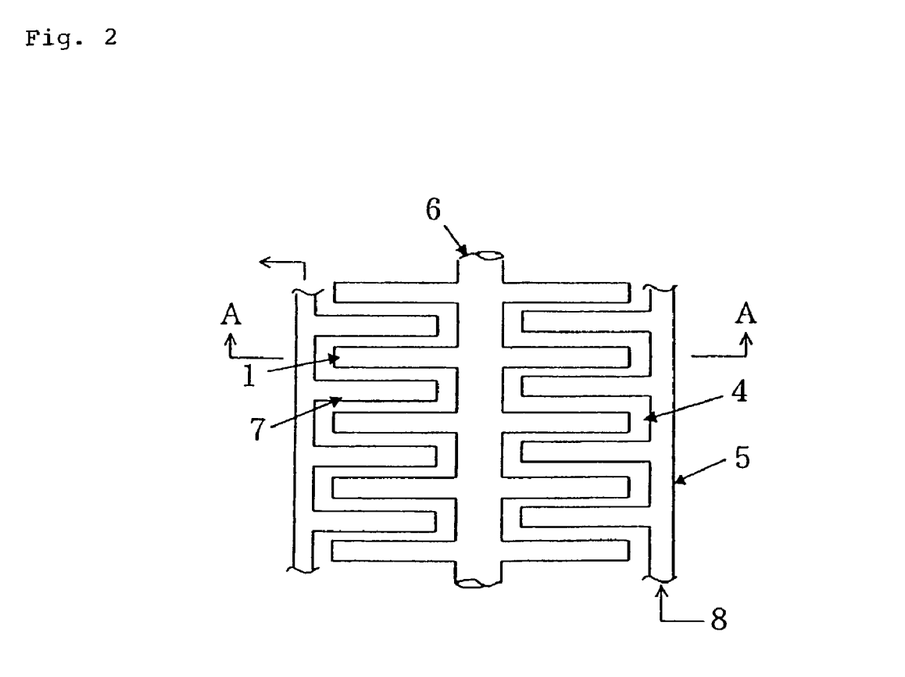
FIG. 2 is a schematic illustration showing a reactor according to one embodiment of the present invention.
Figure 3:
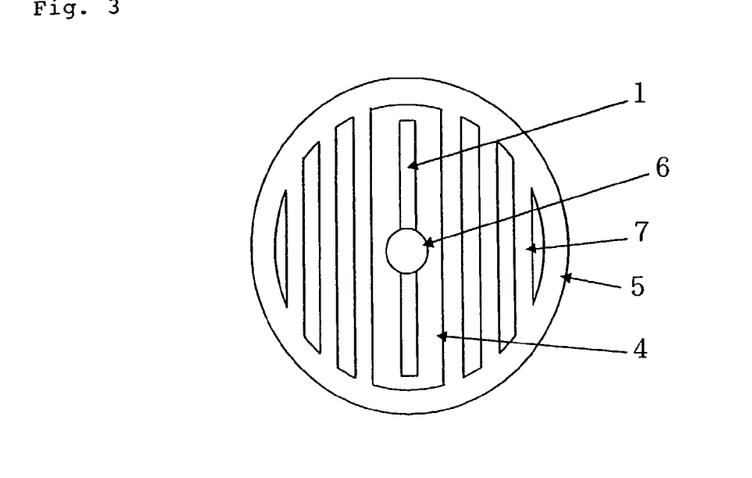
FIG. 3 is a horizontal cross-sectional view taken in the direction of arrows A—A of FIG. 2.

Between the agitating elements 1 which are adjacent each other in the direction of the polymerization mixture in the reactor 4, coiled, tubular, plate-shaped or helical heat exchangers, which are arranged in parallel with the agitating elements 1 and are similar to a heat exchanger 7 depicted in FIG. 3, are arranged at predetermined intervals in plural stages as illustrated in FIG. 2. These heat exchangers 7 are connected to the jacket 5 so that a heat transfer medium 8 (for example, water or a usual heat transfer medium) flows through the heat exchangers 7.

The heat exchangers 7 have partition effect and in addition, can remove heat of polymerization. Baffles formed of plates or bars, which have partition effect, or combinations thereof may be used in place of the heat exchangers 7.

One or more of the agitating elements 1, which are arranged at the predetermined intervals in the multiple stages on the drive shaft 6, may be disposed per stage. The shape of each agitating element 1 may be a flat-blade paddle or pitched blade paddle, a rectangular, rhombic, elongated rectangular, elliptic or like plate, a round bar cut off at upper and lower sides thereof or a bar having a triangular shape in cross-section, which may optionally be tapered or may optionally be twisted or machined aslant with respect to the flowing direction of the polymerization mixture.

Figure 5:
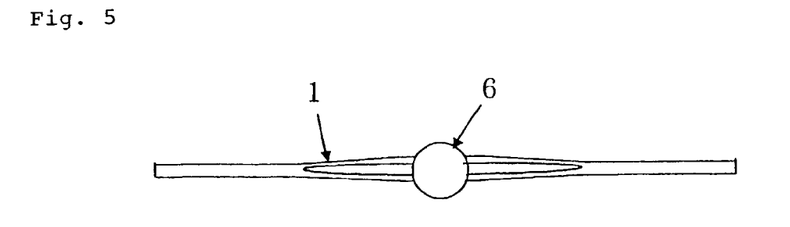
FIG. 5 is a schematic illustration of each agitating element, which was employed in Example 5 and Example 6, as viewed from a plane perpendicular to a drive shaft.
Figure 6:
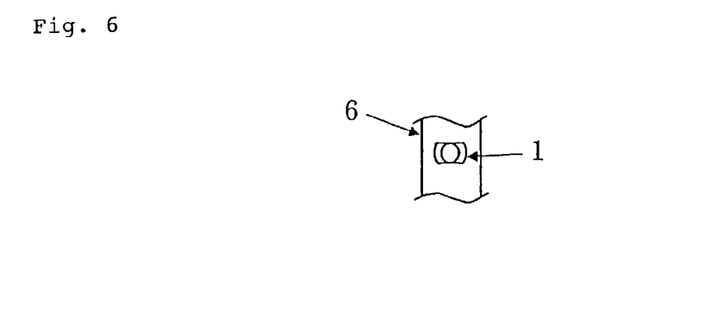
FIG. 6 is a schematic illustration of each agitating element, which was employed in Example 5 and Example 6, as viewed from one of its tips.

The agitating element shown by way of example in FIG. 5 is a tapered round bar, which is cut off at upper and lower sides thereof as viewed in the flowing direction of the liquid. FIG. 6 illustrates the shape of the agitating element 1 as viewed in a direction from one of its tips.

As the distance between the agitating element 1 and the above-described heat exchanger 7, it is desired to set D/H at 0.1 to 0.6, especially at 0.2 to 0.5. A D/H ratio smaller than the lower limit results in a low surface renewal rate, thereby causing adhesion of the resulting polymer, blocking, a reduction in the performance of heat transfer, or the like.

Figure 4:
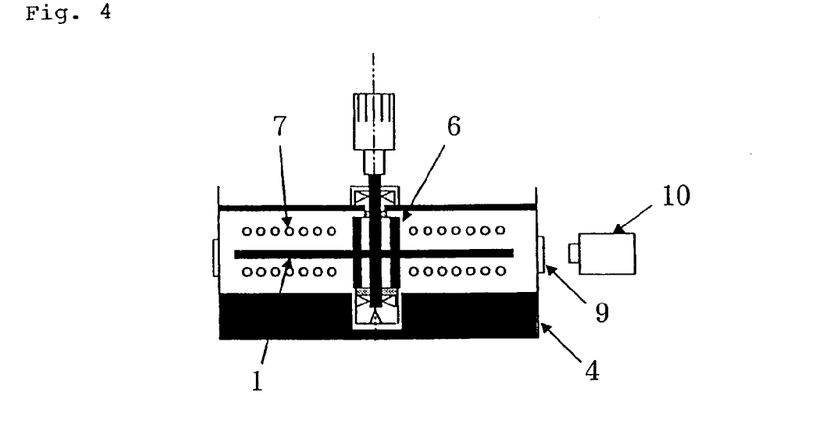
FIG. 4 is a schematic illustration of an apparatus for measuring in the present invention a frequency at which each agitating element begins to vibrate.

As illustrated in FIG. 4, the apparatus for measuring the frequency of agitating elements was constructed by providing a section of the reactor 4, arranging therein a drive shaft 6, and disposing agitating elements 1 in 1 to 3 stages such that the agitating elements 1 extend in a direction perpendicular to the drive shaft 6. Further, heat exchangers 7 were arranged between the agitating elements 1, which are adjacent to each other in the flowing direction of a liquid, such that the heat exchangers 7 extend in parallel with the agitating elements 1. At a predetermined viscosity, the agitating elements 1 were rotating at a predetermined rotating speed and the state of vibrations of one of the agitating elements was photographed by a high-speed camera 10 through an inspection window 9 arranged in a side wall of the reactor 4.

The present invention will hereinafter be described in further detail based on the following Examples. However, the present invention is not limited only to these Examples.

EXAMPLE 1

Three types of agitating elements in the form of round bars were used. The length (R) of each agitating element from a center of a drive shaft to the tip of the agitating element was 840 mm. The distance (H), as measured in the direction of the drive shaft, between the centers of the widths of coil-shaped heat exchangers which were projected on a plane parallel to the drive shaft and interposed any one of the agitating elements was 85 mm. The diameters (D) of the round bars (the widths of the agitating elements projected on a plane parallel to the drive shaft) were 25 mm, 30 mm and 35 mm, respectively. The natural frequencies of the three types of agitating elements were determined. As a result, they were found to be 40 Hz, 48 Hz and 56 Hz, respectively.

The viscosity of a polymer solution was adjusted 0.02 poise by dissolving polystyrene pellets in ethylbenzene which is usually employed upon production of polystyrene. The rotating speeds of the agitating elements were varied to calculate their rotating speeds so that values (K) at which the respective types of agitating elements began to vibrate became equal to the natural frequencies of the respective types of agitating elements. As a result, the rotating speeds were 31.2 rpm, 40.6 rpm and 49.5 rpm, respectively, as shown in Table 1.

Using the apparatus depicted in FIG. 4, the respective types of agitating elements were actually observed to determine rotating speeds at which they began to vibrate. As a result, the rotating speeds were 32 rpm, 42 rpm and 53 rpm, respectively, as shown in Table 1.

Figure 7:
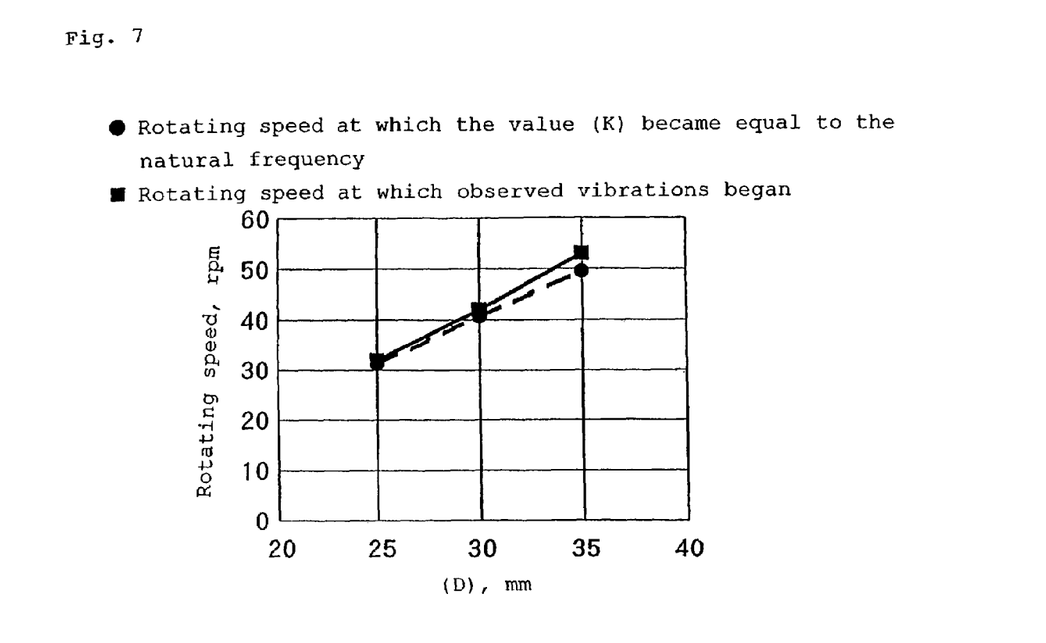
FIG. 7 is a plot of a rotating speed, at which each agitating element in Example 1 begins to vibrate, versus the width (D) of the agitating element projected on a plane parallel to the drive shaft as measured in the direction of the drive shaft.

The diameters of the agitating elements and the rotating speeds at which the agitating elements begin to vibrate are plotted in FIG. 7. The dashed line indicates a correlation between the diameter (D) of round bars and a rotating speed, at which vibrations began, was calculated in accordance with the present invention, while the solid line designates a correlation between the diameter (D) of the round bars and a rotating speed at which observed vibrations began. These lines indicate that safe operation is feasible when the natural frequency (Hz) of agitating elements is greater than a value (K) at which the agitating elements begin to vibrate.

EXAMPLE 2

Three types of agitating elements in the form of round bars were used. The viscosity of a polymer solution was adjusted 3.3 poises. Under similar conditions as in Example 1, the rotating speeds of the respective types of agitating elements were varied to calculate their rotating speeds so that values (K) at which the respective types of agitating elements began to vibrate became equal to the natural frequencies of the respective types of agitating elements. The results are shown in Table 1.

Using the apparatus depicted in FIG. 4, the respective types of agitating elements were actually observed to determine rotating speeds at which they would began to vibrate. The results are shown in Table 1.

Figure 8:
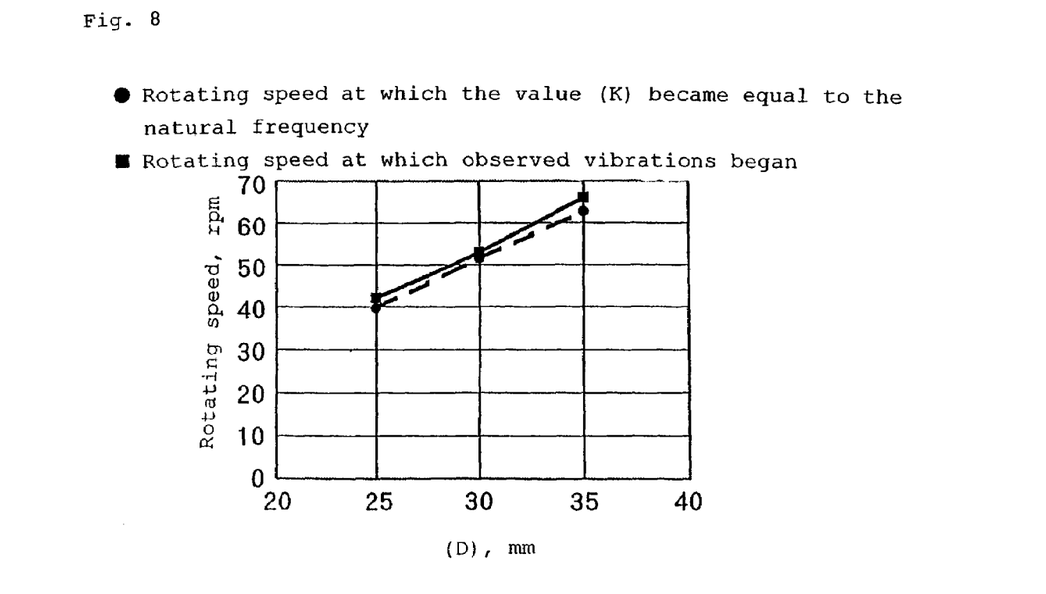
FIG. 8 is a plot of a rotating speed, at which each agitating element in Example 2 begins to vibrate, versus the width (D) of the agitating element projected on a plane parallel to the drive shaft as measured in the direction of the drive shaft.

The diameters (D) of the round bars and the rotating speeds at which the round bars begin to vibrate are plotted in FIG. 8. These lines indicate that safe operation is feasible when the natural frequency (Hz) of agitating elements is greater than a value (K) at which the agitating elements begin to vibrate.

EXAMPLE 3

Three types of agitating elements in the form of round bars were used. The length (R) of each agitating element from a center of a drive shaft to the tip of the agitating element was 1,300 mm. The distance (H), as measured in the direction of the drive shaft, between the centers of the widths of coil-shaped heat exchangers which are projected on a plane parallel to the drive shaft and interpose any one of the agitating elements was 95 mm. The diameters (D) of the round bars were 25 mm, 30 mm and 35 mm, respectively. The natural frequencies of the three types of agitating elements were determined. The results are shown in Table 1. The viscosity was ajusted 0.01 poise. The rotating speeds of the respective types of agitating elements were varied to calculate their rotating speeds so that values (K) at which the respective types of agitating elements began to vibrate became equal to the natural frequencies of the respective types of agitating elements. The results are shown in Table 1.

Using the apparatus depicted in FIG. 4, the respective types of agitating elements were actually observed to determine rotating speeds at which they began to vibrate. The results are shown in Table 1.

Figure 9:
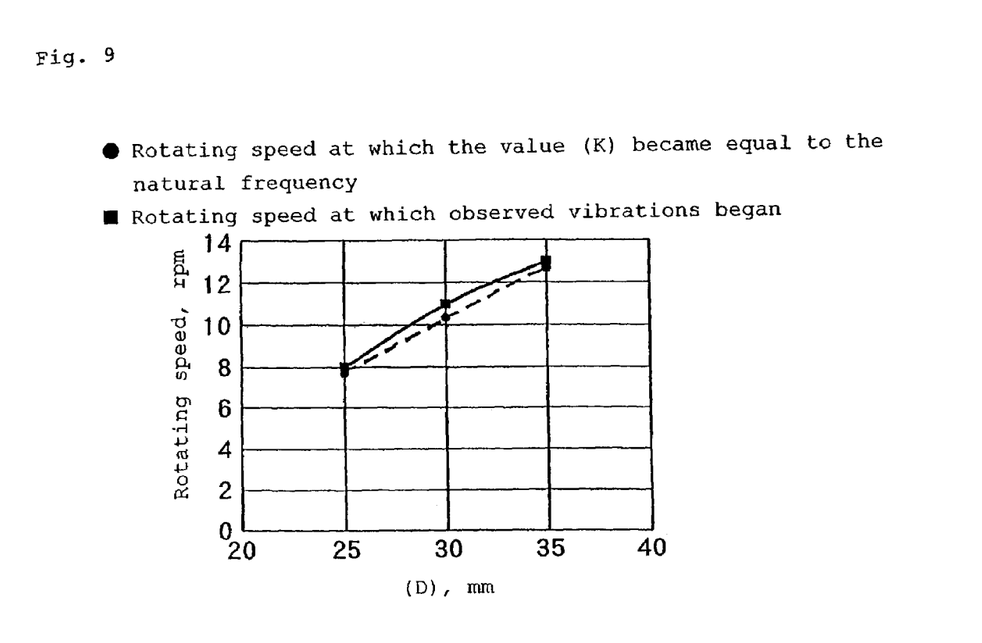
FIG. 9 is a plot of a rotating speed, at which each agitating element in Example 3 begins to vibrate, versus the width (D) of the agitating element projected on a plane parallel to the drive shaft as measured in the direction of the drive shaft.

The diameters (D) of the round bars and the rotating speeds at which the round bars begin to vibrate are plotted in FIG. 9. These lines indicate that safe operation is feasible when the natural frequency (Hz) of agitating elements is greater than a value (K) at which the agitating elements begin to vibrate.

EXAMPLE 4

Agitating elements in the form of round bars were used. The viscosity of a polymer solution was adjusted 3.3 poises. Under similar conditions as in Example 3, the rotating speeds of the respective types of agitating elements were varied to calculate their rotating speeds so that values (K) at which the respective types of agitating elements began to vibrate became equal to the natural frequencies of the respective types of agitating elements. The results are shown in Table 1.

Using the apparatus depicted in FIG. 4, the respective types of agitating elements were actually observed to determine rotating speeds at which they began to vibrate. The results are shown in Table 1.

Figure 10:
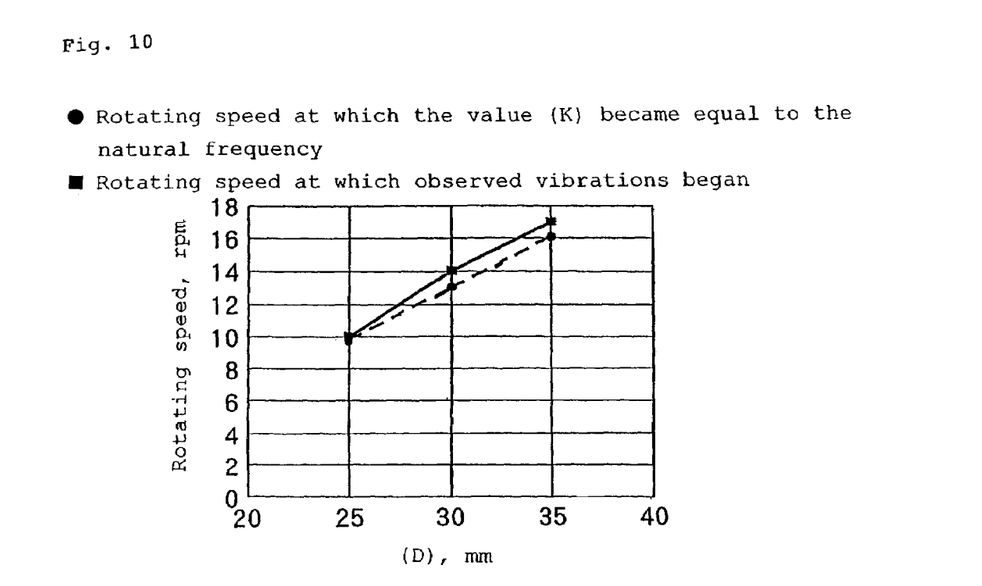
FIG. 10 is a plot of a rotating speed, at which each agitating element in Example 4 begins to vibrate, versus the width (D) of the agitating element projected on a plane parallel to the drive shaft as measured in the direction of the drive shaft.

The diameters (D) of the round bars and the rotating speeds at which the round bars begin to vibrate are plotted in FIG. 10. These lines indicate that safe operation is feasible when the natural frequency (Hz) of agitating elements is greater than a value (K) at which the agitating elements begin to vibrate.

EXAMPLE 5

Three types of agitating elements as shown in FIG. 5 and FIG. 6 were employed. Each agitating element was fabricated by cutting off a round bar at upper and lower sides thereof, which bar had a diameter twice as large as the width (D) of the agitating element projected on a plane parallel to a drive shaft as measured in the direction of the drive shaft, and by tapering the round bar toward its tip. The length (R) of each agitating element from a center of the drive shaft to each tip of the agitating element was 840 mm. The distance (H), as measured in the direction of the drive shaft, between the centers of the widths of coil-shaped heat exchangers which were projected on a plane parallel to the drive shaft and interposed any one of the agitating elements was 85 mm. The widths (D) of the agitating elements projected on a plane parallel to the drive shaft as measured in the direction of the drive shaft were 25 mm, 30 mm and 35 mm, respectively. The natural frequencies of the agitating elements were determined. The results are shown in Table 1. The viscosity was adjusted 10.8 poises. The rotating speeds of the respective types of agitating elements were varied to calculate their rotating speeds so that values (K) at which the respective types of agitating elements began to vibrate became equal to the natural frequencies of the respective types of agitating elements. The results are shown in Table 1.

Figure 11:
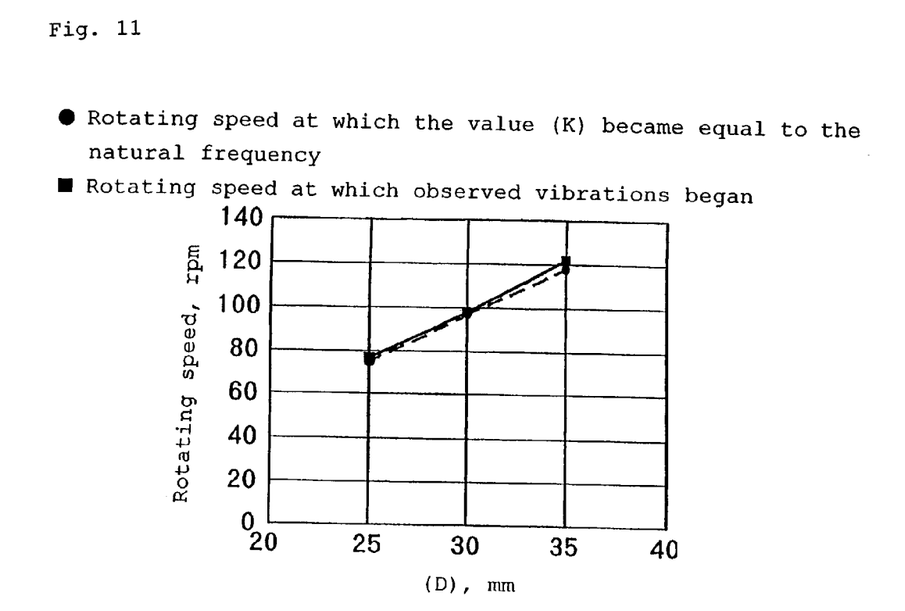
FIG. 11 is a plot of a rotating speed, at which each agitating element in Example 5 begins to vibrate, versus the width (D) of the agitating element projected on a plane parallel to the drive shaft as measured in the direction of the drive shaft.

Using the apparatus depicted in FIG. 4, the respective types of agitating elements were actually observed to determine rotating speeds at which they began to vibrate. The results are shown in Table 1. The widths of the agitating elements projected on a plane parallel to the drive shaft as measured in the direction of the drive shaft and the rotating speeds at which the agitating elements begin to vibrate are plotted in FIG. 11. These lines indicate that safe operation is feasible when the natural frequency (Hz) of agitating elements is greater than a value (K) at which the agitating elements begin to vibrate.

EXAMPLE 6

Agitating elements as shown in FIG. 5 and FIG. 6 were employed. Each agitating element was fabricated by cutting off a round bar at upper and lower sides thereof, which bar had a diameter twice as large as the width (D) of the agitating element projected on a plane parallel to a drive shaft as measured in the direction of the drive shaft, and by tapering the round bar toward its tip. The length (R) of each agitating element from a center of the drive shaft to each tip of the agitating element was 1,300 mm. The distance (H), as measured in the direction of the drive shaft, between the centers of and the widths of coil-shaped heat exchangers which were projected on a plane parallel to the drive shaft and interposed any one of the agitating elements was 95 mm. The widths (D) of the agitating elements projected on a plane parallel to the drive shaft as measured in the direction of the drive shaft were 25 mm, 30 mm and 35 mm, respectively. The natural frequencies of the agitating elements were determined. The results are shown in Table 1. The viscosity was adjusted 3.3 poises. The rotating speeds of the respective types of agitating elements were varied to determine their rotating speeds at which values (K) at which the respective types of agitating elements began to vibrate became equal to the natural frequencies of the respective types of agitating elements. The results are shown in Table 1.

Figure 12:
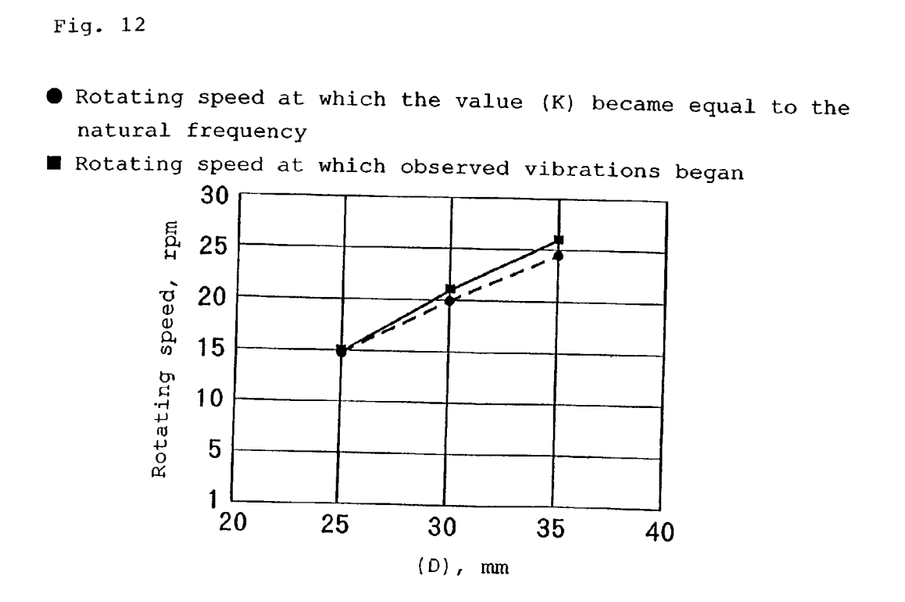
FIG. 12 is a plot of a rotating speed, at which each agitating element in Example 6 begins to vibrate, versus the width (D) of the agitating element projected on a plane parallel to the drive shaft as measured in the direction of the drive shaft.

Using the apparatus depicted in FIG. 4, the respective types of agitating elements were actually observed to determine rotational speeds at which they began to vibrate. The results are shown in Table 1. The widths of the agitating elements projected on a plane parallel to the drive shaft as measured in the direction of the drive shaft and the rotating speeds at which the agitating elements begin to vibrate are plotted in FIG. 12.

These lines indicate that safe operation is feasible when the natural frequency (Hz) of agitating elements is greater than a value (K) at which the agitating elements begin to vibrate.

TABLE 1

|  | R (mm) | D (mm) | H (mm) | Viscosity (poise) | Natural frequency (Hz) | Rotating speed at which value K became equal to the natural frequency (rpm) | Rotating speed at which observed vibrations began (rpm) |
|---|---|---|---|---|---|---|---|
| Ex. 1 | 840 | 25 | 85 | 0.02 | 40 | 31.2 | 32 |
|  | 840 | 30 | 85 | 0.02 | 48 | 40.6 | 42 |
|  | 840 | 35 | 85 | 0.02 | 56 | 49.5 | 53 |
| Ex. 2 | 840 | 25 | 85 | 3.3 | 40 | 39.6 | 42 |
|  | 840 | 30 | 85 | 3.3 | 48 | 51.4 | 53 |
|  | 840 | 35 | 85 | 3.3 | 56 | 62.8 | 66 |
| Ex. 3 | 1300 | 25 | 95 | 0.01 | 14.6 | 7.7 | 8 |
|  | 1300 | 30 | 95 | 0.01 | 17.6 | 10.3 | 11 |
|  | 1300 | 35 | 95 | 0.01 | 20.5 | 12.7 | 13 |
| Ex. 4 | 1300 | 25 | 95 | 3.3 | 14.6 | 9.8 | 10 |
|  | 1300 | 30 | 95 | 3.3 | 17.6 | 13.0 | 14 |
|  | 1300 | 35 | 95 | 3.3 | 20.5 | 16.1 | 17 |
| Ex. 5 | 840 | 25 | 85 | 10.8 | 61 | 74.5 | 77 |
|  | 840 | 30 | 85 | 10.8 | 73 | 96.6 | 98 |
|  | 840 | 35 | 85 | 10.8 | 85 | 117.8 | 122 |
| Ex. 6 | 1300 | 25 | 95 | 3.3 | 22 | 14.8 | 15 |
|  | 1300 | 30 | 95 | 3.3 | 27 | 20.0 | 21 |
|  | 1300 | 35 | 95 | 3.3 | 31 | 24.4 | 26 |

According to the reactor of this invention, a shearing stress can be applied by agitation to eliminate any zone of extraordinary stagnation. Further, the distance between each agitating element and its associated baffle or heat exchanger can be shortened to prevent adhesion of a polymer or a reduction in heat transfer coefficient. In conventional reactors, any attempt to increase the rotating speed involves a potential problem such as stress fractures of agitating elements or contact of the agitating elements with heat exchanger tubes due to vibrations of the agitating elements. In the reactor according to the present invention, however, no vibrations take place on the agitating elements so that safe operation is feasible.

The invention claimed is:

1. A reactor comprising a cylindrical vessel elongated in a flowing direction of a liquid and provided with a liquid inlet and a liquid outlet, a drive shaft arranged coaxially with said cylindrical vessel and one or more plate-shaped or round-bar-shaped agitating elements extending in a direction perpendicular to said drive shaft, said drive shaft and agitating elements being arranged inside said cylindrical vessel, and baffles composed of plates or round bars or combinations thereof and/or coiled, tubular, plate-shaped or helical heat exchangers, said baffles and/or said heat exchangers being arranged on a side of an inner wall of said reactor, characterized in that said agitating elements each has a natural frequency greater than a value (K) at which said agitating element begins to vibrate, and said value is determined from the following formula:

$$(K) = \frac{(4.317(D/H)^2 + 0.867)(n/60)R/D}{1 - \exp(-0.1404\mu - 0.8633)}$$

wherein n: rotating speed (rpm) of said agitating element,

R: length (m) of said agitating element from a center of said drive shaft to each tip of said agitating element, D: width (m) of said agitating element projected on a plane parallel to said drive shaft as measured in a direction of said drive shaft, H: distance (m), as measured in said direction of said drive shaft, between centers of widths of said plates or round bars or combinations thereof or said coiled, tubular, plate-shaped or helical heat exchangers which are projected on said plane parallel to said drive shaft and interpose said agitating element, and μ: viscosity (poise) of said liquid inside said reactor.

2. A reactor according to claim 1, which is a polymerization reactor.

3. A reactor according to claim 1, which is a polymerization reactor for producing a styrene polymer or styrene copolymer.

4. A reactor according to claim 1, wherein the ratio of its length (l), as measured in said flowing direction of said liquid, to its diameter (d) ranges from 1.1 to 15.

5. A reactor according to claim 1, wherein each of said agitating elements is a flat-blade paddle or pitched blade paddle, a rectangular, rhombic, elongated rectangular or elliptic plate, a round bar cut off at upper and lower sides thereof or a bar having a triangular shape in cross-section, which may be twisted, tilted or tapered.

6. A reactor according to claim 1, wherein D/H in said formula ranges from 0.1 to 0.6.

* * * * *